United States Patent [19]
Lair

[11] Patent Number: 5,181,676
[45] Date of Patent: Jan. 26, 1993

[54] THRUST REVERSER INTEGRATING A VARIABLE EXHAUST AREA NOZZLE

[76] Inventor: Jean-Pierre Lair, 8023 Vantage, Suite 1450, San Antonio, Tex. 78230

[21] Appl. No.: 817,278

[22] Filed: Jan. 6, 1992

[51] Int. Cl.[5] .............................. B64C 25/68
[52] U.S. Cl. ...................... 244/110 B; 239/265.19; 60/226.2
[58] Field of Search ............... 244/110 B, 23 D, 12.5; 239/265.19, 265.37, 265.33, 265.27; 60/229.2, 230

[56] References Cited

U.S. PATENT DOCUMENTS

| | | | |
|---|---|---|---|
| 2,715,312 | 8/1955 | Brame | 239/265.19 |
| 3,568,792 | 3/1971 | Urquhart | 239/265.19 |
| 3,601,340 | 8/1971 | Hilbig | 239/265.19 |
| 4,129,269 | 12/1978 | Fage | 244/110 B |
| 4,519,561 | 5/1985 | Timms | 244/110 B |
| 4,671,460 | 6/1987 | Kennedy et al. | 239/265.19 |
| 4,966,327 | 10/1990 | Fage et al. | 244/110 B |

FOREIGN PATENT DOCUMENTS

| | | | |
|---|---|---|---|
| 0648842 | 11/1962 | Italy | 244/110 B |
| 0182858 | 3/1963 | Sweden | 244/110 B |

*Primary Examiner*—Joseph F. Peters, Jr.
*Assistant Examiner*—Christopher P. Ellis
*Attorney, Agent, or Firm*—Harold H. Dutton, Jr.

[57] ABSTRACT

A thrust reverser for jet engines comprising a pair of symmetrical thrust reverser door members which are pivotally mounted on an engine about an axis which is substantially diametrical with respect to the exhaust nozzle of the engine, the doors having scarfed trailing edges in order that they may pivot between stowed and deployed positions, a pair of pivotally mounted half-shells surrounding at least the trailing edges and defining a planar exhaust outlet for the engine; the pivot axes for the doors is movable in order to vary the area of the exhaust outlet defined by the half-shells depending upon the particular stage of flight.

17 Claims, 12 Drawing Sheets

FIG. 7
FIG. 8
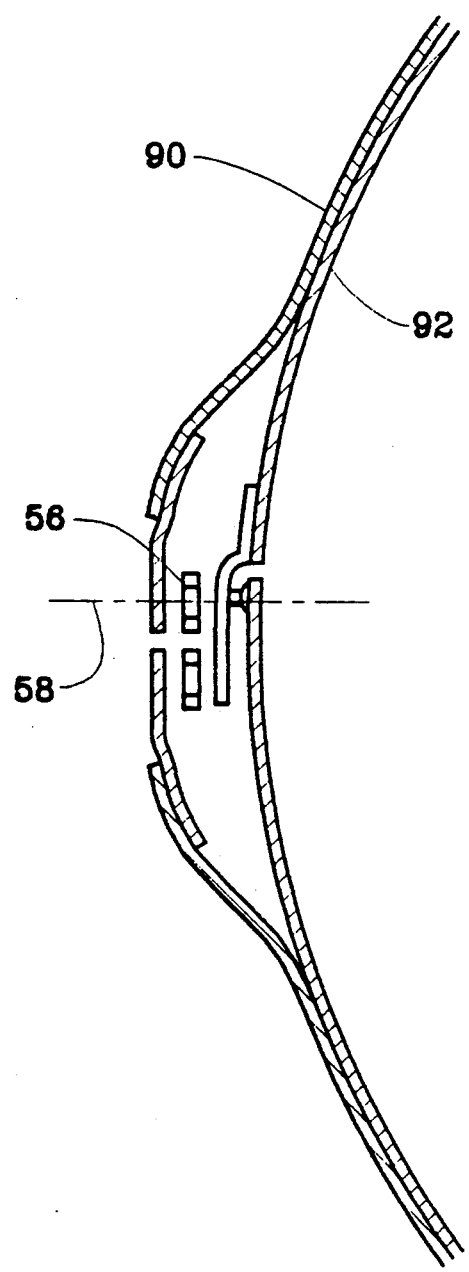
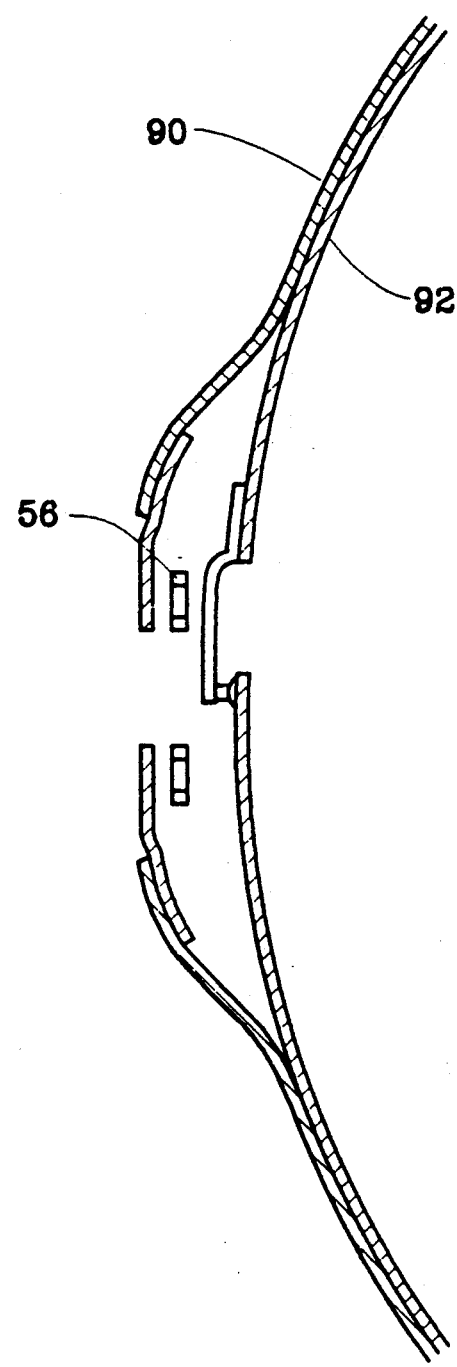

FIG. 9
FIG. 10
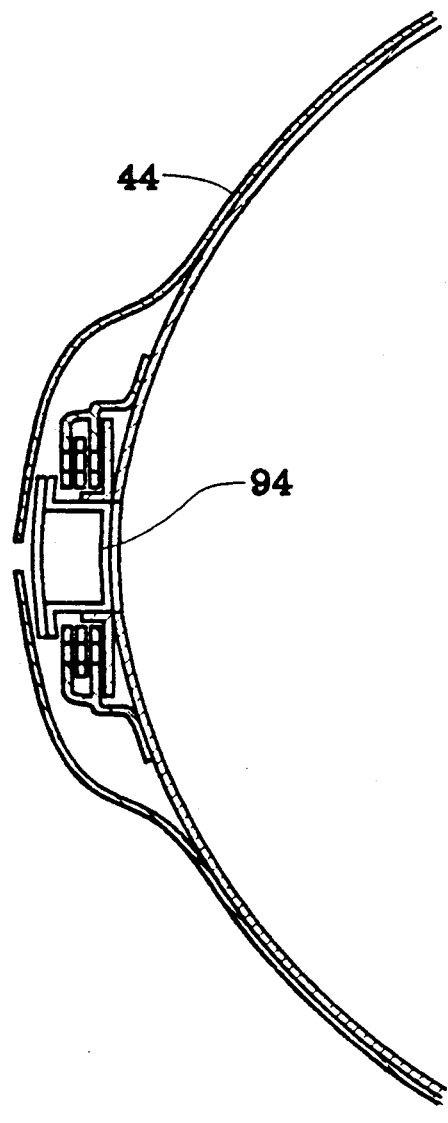
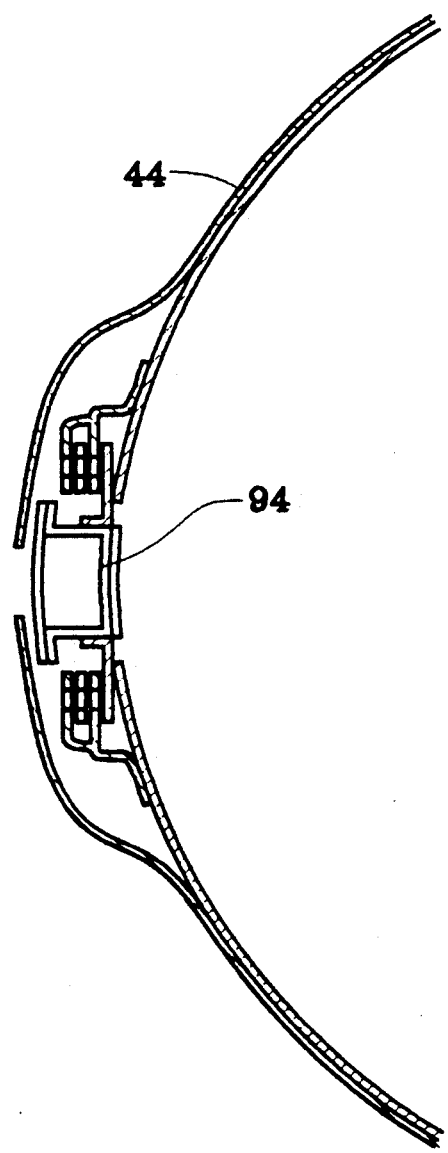

THRUST REVERSER INTEGRATING A VARIABLE EXHAUST AREA NOZZLE

This invention relates to a thrust reverser for jet engines, especially the type used on aircraft. More particularly, the invention relates to a thrust reverser which integrates a variable exhaust area nozzle.

BACKGROUND AND OBJECTS OF THE INVENTION

In order to reduce the landing distance of a jet engine powered aircraft, as well as to increase the margin of safety when the aircraft is landing on a wet or icy runway, thrust reversers are utilized on the jet engines in order to provide a braking thrust for the aircraft. Typically, such thrust reversers are formed by thrust reverser "doors" which are capable of pivoting between two positions about an axis which is transverse and substantially diametrical with respect to the jet of the engine.

The first position finds the doors in a stowed position, out of the direct path of the exhaust blast of the engine. In this position, the doors form the exhaust nozzle of the gas turbine engine so that the thrust of the engine is directly rearward, thereby producing the forward thrust of the aircraft. In the second position, the doors are pivoted about the pivot axis to a transverse, blast deflecting or deployed position, to intercept and redirect the jet blast and produce the braking thrust for the aircraft when needed. In such thrust reversers, the trailing edge of the reverser doors must be fully scarfed to enable the deployment of the doors and the butting of the trailing edges of the two doors against one another in the deployed position. This scarfing produces what is known as a "fishmouth" shape at the exhaust outlet because of its appearance when viewed from the side.

The prior art demonstrates some variable area exhaust nozzles for thrust reversers, and such devices are shown in U.S. Pat. No. 4,966,327 and French Patent 2,614,939. Theoretically, a variable area exhaust provides certain benefits for the jet engines, in enabling them to adapt to different conditions of the flight. For example, different characteristics of the engines are desirable for take off, climb and cruise modes of operation, and varying the exhaust area enables the engine to better achieve the optimum characteristics.

According to the prior patents mentioned above which integrate a variable exhaust area nozzle with the thrust reverser, the thrust reverser doors do not (and cannot) in any of the controllable positions of the reverser doors define the throat of the exhaust nozzle to be at the trailing edge of the nozzle/reverser doors. In these prior patents, the inner flow line of the thrust reverser doors is convergent to the throat, with a cylindrical extension aft of the throat. This means that at any position of the thrust reverser nozzle, the throat of the nozzle always remains significantly upstream of the reverser nozzle trailing edge. This is an inherent characteristic in the design of the prior art as it is described in French patent 2,382,594.

In the case of the prior art thrust reversers using the scarfed or fishmouth nozzles, another drawback arises in that the performance characteristics of the engine are somewhat degraded such that varying the exhaust area merely helps to recapture the efficiency lost to the scarfing. This degradation of performance is caused by a not-insignificant lateral efflux of exhaust gas in the area of the cutouts.

In U.S. Pat. Nos. 4,194,692 and 4,093,122, the thrust reverser doors are incapable of defining, in any of their controllable positions, the throat area of the nozzle. By the term "throat" as it is commonly used in this field is meant the point or location of the minimum cross-sectional area of the engine's ejection nozzle. In both of these prior patents, the throat area of the nozzle is not adjusted by the thrust reverser doors, but rather by a separate variable convergent nozzle.

Accordingly, a primary object of the present invention is to provide a thrust reverser which overcomes the aforementioned disadvantages of prior art thrust reversers.

A further object of the invention is to provide an improved thrust reverser which integrates a variable area exhaust nozzle.

Still another object of the invention is to provide a thrust reverser having a variable area exhaust nozzle and a planar exhaust nozzle, eliminating the scarfed or fishmouth configuration of prior thrust reverser doors.

Yet another object of the invention is to provide a thrust reverser in which variation in the area of the exhaust throat takes place at the trailing edge of the planar nozzle.

Still a further object of the invention is to provide a thrust reverser construction wherein the the reverser doors are the operating means for the exhaust nozzle in order to optimize the engine operating characteristics for different phases of the flight.

These and other objects and advantages of this invention will become apparent from a consideration of the following description of the invention.

DESCRIPTION OF THE INVENTION

The present invention provides a thrust reverser formed by a pair of doors, each door being pivotally mounted on a substantially diametrically arranged pivot axis. The inner skins of the doors are scarfed to enable their deployment by pivoting about the pivot axis. A pair of half shells surround the thrust reverser doors, and the throat of the exhaust nozzle is formed by the shells rather than the thrust reverser doors. The throat is preferably coincident with the trailing edge of the shells, in either of the positions of the shells.

The shells are mounted so that they are actuated by an actuator between the various positions of the exhaust nozzle, and controlled according to the flight condition of the aircraft. A further actuator is provided for the thrust reverser function, for pivoting the doors to the reversing position, and a latching mechanism is also provided for the reverser doors.

DESCRIPTION OF THE DRAWINGS

The invention will now be described with particular reference to the accompanying drawings, which show by way of non-limiting examples, the preferred features and embodiments of the invention. In the drawings:

FIG. 7 is a partial cross-sectional view of the variable exhaust nozzle at its trailing edge when in the cruise position;

FIG. 8 is a view similar to FIG. 7 showing the variable nozzle in the take-off position;

FIGS. 9 and 10 are views similar to FIGS. 7 and 8 of an alternative embodiment;

DETAILED DESCRIPTION OF PREFERRED EMBODIMENTS

Figure 1:
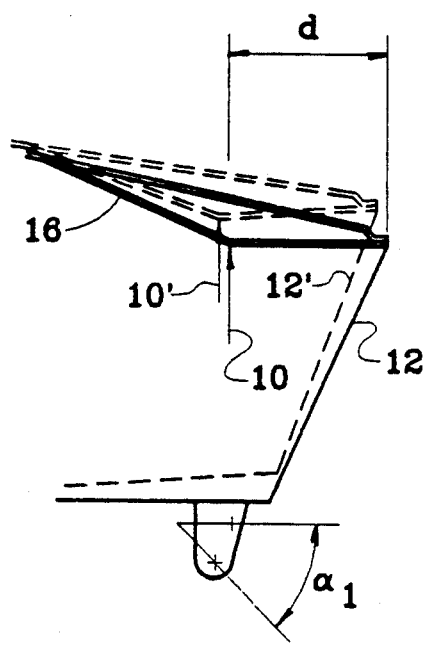
FIG. 1 is a schematic representation of a prior art thrust reverser.

In order to gain a better understanding of the present invention, reference will first be had to FIG. 1 which illustrates schematically the prior art thrust reversers, for example the type disclosed in French patents 2,382,594 and 2,614,939, or in U.S. Pat. No. 4,966,327. In this FIGURE, the small exit area (or cruise) configuration is represented by the solid line position, while the take-off or large exit area configuration is represented in the dashed line position.

In FIG. 1, the throat 10 of the nozzle is upstream of the trailing edge 12 of the thrust reverser door at a distance 'd' which is equal to the length of the cylindrical extension 14. Further, the profile of the inner flow contour defined by portions 14 and 16, is necessarily either convergent-cylindrical or convergent-divergent, as the extension 14 may be designed to be either cylindrical or divergent. But, the nozzle cannot be purely convergent.

When the thrust reverser nozzle is opened up to the large exit area, the new throat 10' remains upstream of the trailing edge 12'. It is also important to note that this prior art has a non-planar exhaust outlet, defined by the trailing edges of the thrust reverser nozzle, because of the fishmouth configuration of the trailing edge according to this type of design. As mentioned above, this type of fishmouth exhaust nozzle causes engine performance degradation because of the significant loss of nozzle efficiency, due to the efflux spillage occurring sideways through the cut away portions created by the scarfed cuts.

Figure 2:
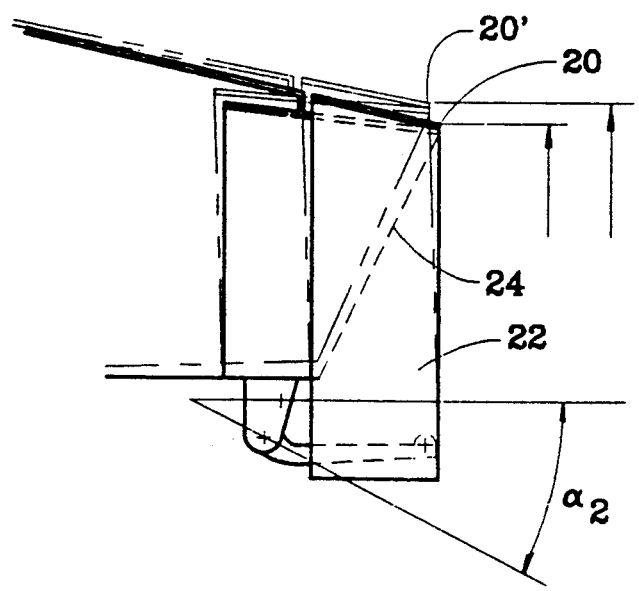
FIG. 2 is a schematic representation of the thrust reverser according to the present invention.

FIG. 2 shows a similar schematic representation for the present invention. Here, the fishmouth portion of the exhaust nozzle is effectively eliminated for all positions of the exhaust nozzle, and therefor does not cause the same degradation of engine performance, since no efflux spillage can occur. This is a consequence of the planar exit of the nozzle.

The throat 20 of the exhaust nozzle is defined by the trailing edge of a pair of half-shells 22 which surround the thrust reverser doors 24, and not by the thrust reverser doors 24 themselves. When the nozzle is opened up to the large exit area, the new throat 20' is still defined by the trailing edge of the half-shells 22. Additionally, the inner flow line of the exhaust nozzle can be purely convergent, which is a test configuration for optimum cruise performance. When opened up to the large exit area for improved take off performance, the inner profile can be either purely convergent, or can become divergent.

FIG. 2 also shows that to achieve the same exhaust area increase as in FIG. 1, the angular rotation $\alpha_2$ of the thrust reverser door according to the invention is significantly less than $\alpha_1$ of the prior art, which also represents a significant benefit by minimizing the inner and outer flow discontinuities when the nozzle is commanded to move to its different positions.

Figure 3:
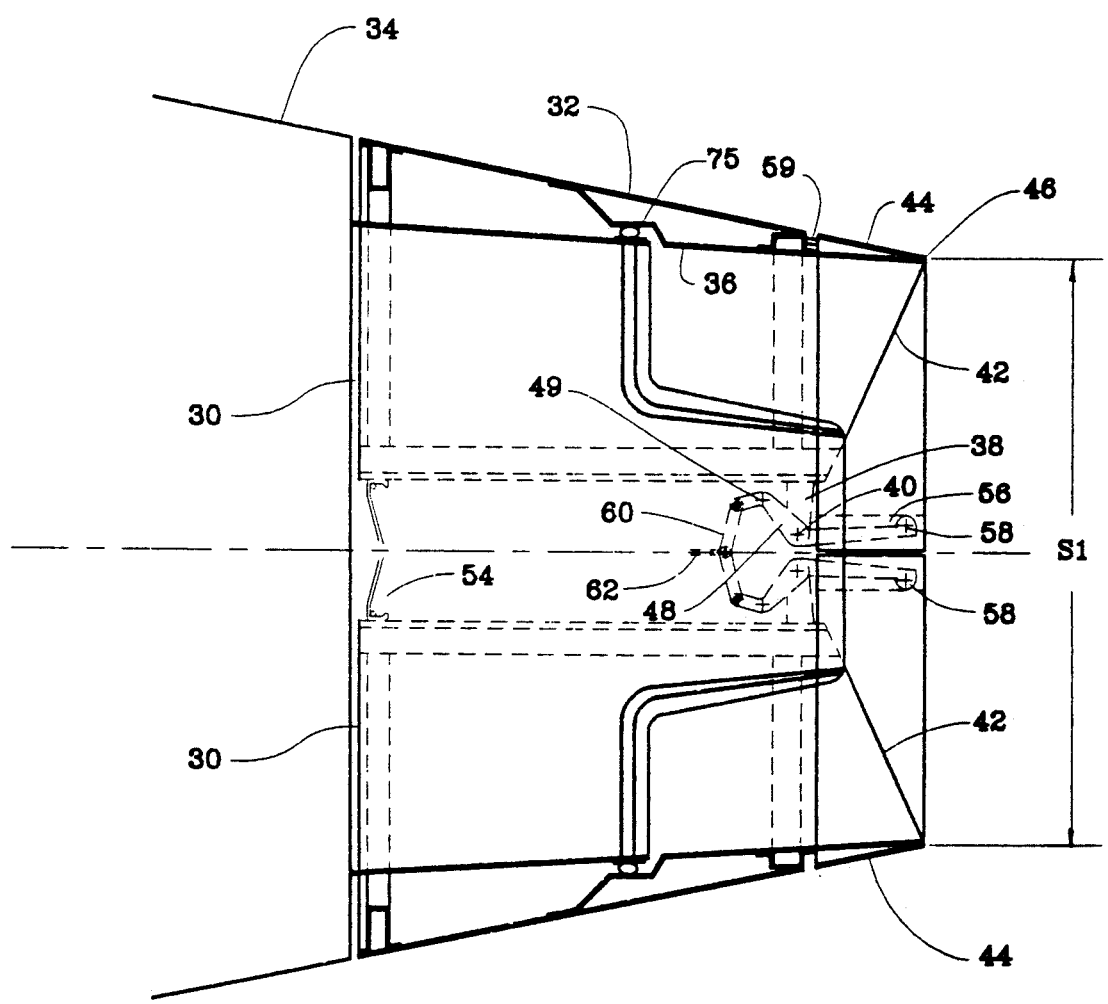
FIG. 3 is a longitudinal sectional view of a jet engine showing the thrust reverser according to the present invention.

Referring now to FIG. 3 for a more detailed description of the invention, the exhaust system according to the invention is seen to comprise two identical thrust reverser doors 30 having outer skins 32 which insure the continuity of the outer flow with the fixed upstream structure or jet pipe 34 of the nacelle. The inner skins 36 of the doors 30 are fully scarfed in order to enable pivotal deploying of the reverser doors.

Figure 15:
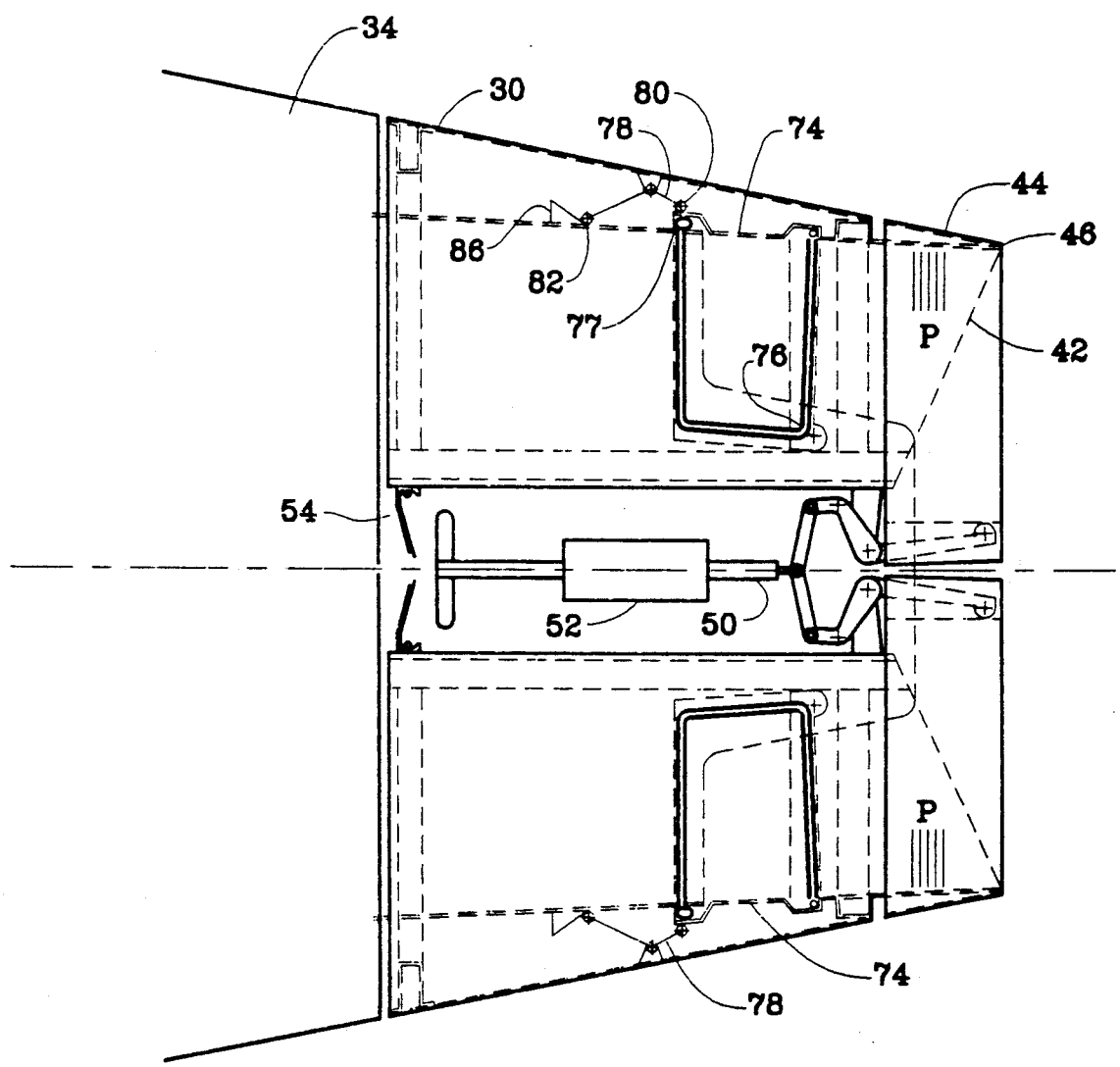
FIGS. 15 and 16 are similar to FIGS. 3 and 6 but of an alternate embodiment.

The inner skin 36 of each thrust reverser door 30 can either be fixed as shown in FIG. 3, or can be movable as shown in FIG. 15. In either case, the inner skin 36 is essentially of a hemi-truncated shape, ensuring the continuity of the jet flow with that of the jet pipe 34.

A flange 38 extends from each thrust reverser door and serves to mount the doors 30 for pivotal movement about the axis 40. Since the inner skins 36 are fully scarfed, the thrust reverser doors may pivot to their deployed position by pivoting about the axes 40, so that the trailing edges 42 of each door 30 come into abutting contact, either directly or through abutment fittings (not shown).

Two half-shells 44 surround the rear portion of the doors 30 and form the exhaust nozzle by ensuring the inner flow continuity of the inner skins 36 of the thrust reverser doors 30. The half-shells 44 have a planar exit with the throat 46 being defined by their trailing edge. The half-shells are also pivotally mounted to two mounting arms 56. As will be seen below, these arms 56 permit varying the throat area for any desired positions of the thrust reverser doors, when the doors are in the stowed position, and also permit pivoting of the half-shells when the doors are pivoted to their deployed position.

The system include a first actuator system 50 (FIG. 15) for varying the area of the exhaust nozzle, a second actuator system 52 for actuating the thrust reverser doors, and a latching mechanism 54 for securing the doors 30. In addition, a sealing arrangement is provided to insure a leak free installation.

In the position shown for the thrust reverser doors in FIGS. 3 and 15, the nozzle is in the small exit area configuration which corresponds to the cruise position, and it is important to note that in this configuration, there are no flow discontinuities, either for the inner jet flow or for the outer ambient air flow. Since most of the flight duration is in the cruise mode, it is essential that this condition be observed in order to achieve optimum performance in the cruise mode.

As indicated above, each of the doors 30 is hinged about an axis 40 arranged substantially diametrically of the jet pipe 34. However, the axis 40 for each door can be moved to different positions when the arms 48 are moved to different angular positions by the actuating system 50.

The half-shells 44 are pivotally mounted to the arms 56 at pivot axes 58, and the arms 48 and 56 are pivotally connected as well at the pivot axes 40 of the thrust reverser doors 30. In addition, the arms 48 are pivotally mounted at 49 to the jet pipe. When the arms 48 are moved to different angular positions by their actuator system, they in turn drive the doors 30 which in turn drive the half-shells 44 varying the area of the exhaust nozzle. The linkage connecting these half-shells to the doors is shown and described in greater detail in my co-pending patent application Ser. No. 07/798,213 filed Nov. 26, 1991, the specification of which is incorporated herein by reference. Essentially the system comprises a link 59 hinged to the thrust reverser door at one end and hinged to the half-shell at the other end.

Also of significance is the fact that there is no need for a specific latching system for maintaining the throat of the exhaust nozzle (the throat again being at the trailing edge 46 of the half-shells 44) in the minimum area or cruise position. This position (with area S1) is self-locked because of the internal gas pressure p acting on the inner skins 36 and 92 of the reverser doors 30 and half-shells 92 as represented by arrows in FIG. 15. This self-locking feature of the cruise position is the result of a unique over-center linkage arrangement which controls the angular position of the arms 48. Link arms 60 are pivotally attached to the rod 62 of actuator 50 at one end and to arms 48 at the other end as shown, in an overcenter manner.

Figure 13:
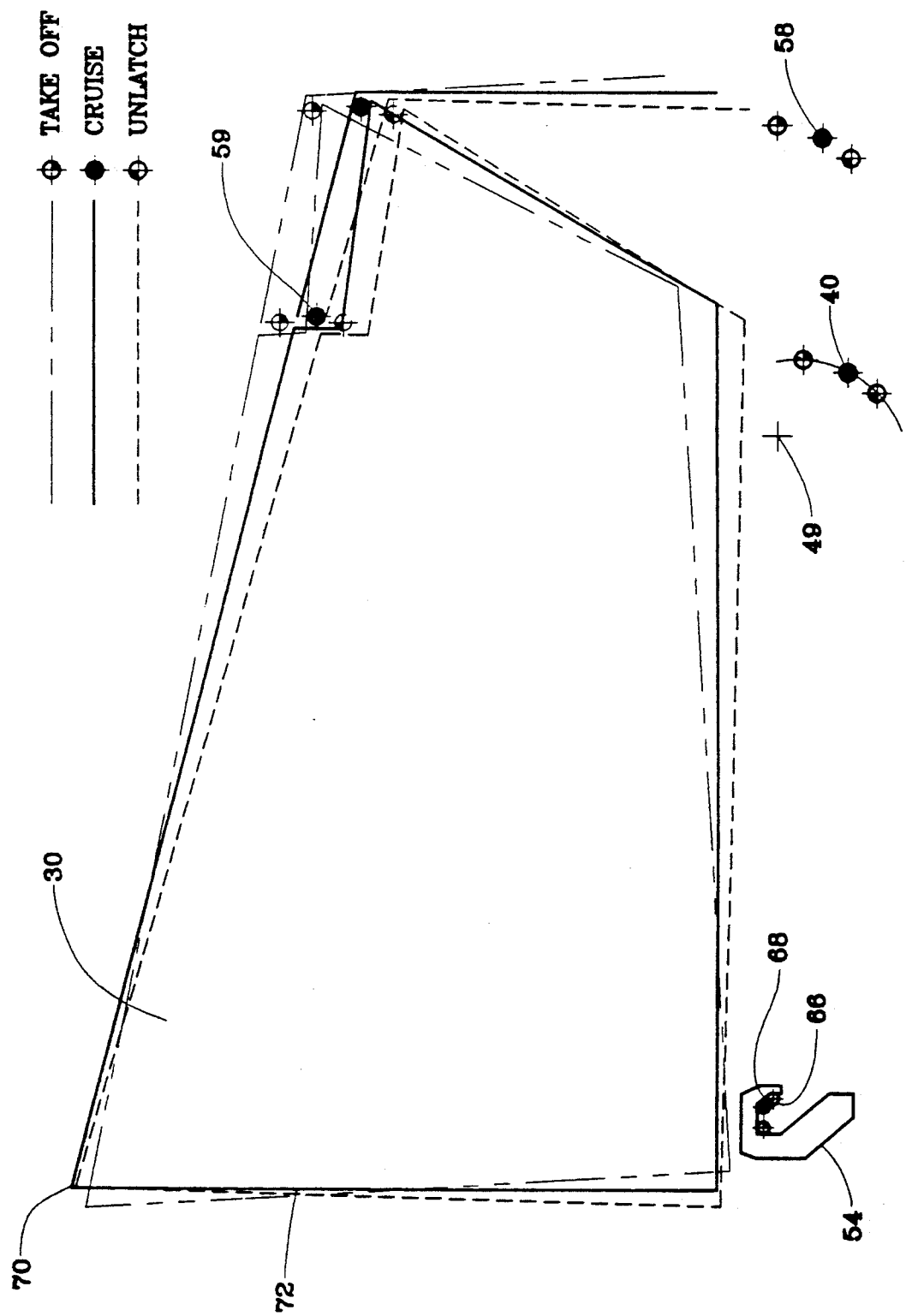
FIG. 13 is a schematic representation showing the three extreme positions of the variable nozzle: cruise, unlatch, and take off.

FIG. 13 shows a schematic representation of the three positions of the exhaust nozzle, i.e. cruise, unlatch, and take-off. Depending on the particular control system used to drive the thrust reverser pivot axis 40, movement may be to either of the extreme positions (i.e. cruise or take-off) or may be to infinitely variable or predetermined positions between the two extremes. The actuator, for example, should be a linear type actuator so as to provide linear motion of the rod 62. Thus, the actuator may be a hydraulic or pneumatic piston and cylinder, or may be a solenoid, or may be a screw or rack and pinion type actuator. The present invention is not restricted to the detailed configuration of the particular type of actuator used, however, the principles of the invention may nonetheless be fully understood without further description of the details of the actuator.

As is further shown schematically in FIG. 13, the pivot point 40 for the reverser doors moves in an arcuate path as the actuator 50 is actuated, and this in turn causes pivoting of the arm 48 about the pivot point 49 and movement of the pivot point 40 in an arcuate path. As this pivotal movement occurs, the latch receptacle 66 moves with respect to the latch arm 54. Despite this movement, the adjustment of the exhaust nozzle size is accommodated by this allowed movement of the latch receptacle, while the door, and the latch arm, remain in the stowed position. Further, the latch arm 54 has a ramp portion 68 which serves to lower the upper portion 70 of the leading edge 72 of the thrust reverser doors 40, when the axis 40 is moved to the take-off position. This feature allows each upper corner 70 to penetrate inside the fixed structure 34. It also allows the small rotation of each reverser door around its respective latch receptacle during the opening of the exhaust nozzle defined by the half-shells 44 from cruise to take-off positions. Further, as best seen in FIG. 6, there is no discontinuity between the outer envelope of the structure 34 and the outer skin 32 of the thrust reverser doors 30.

Figure 4:
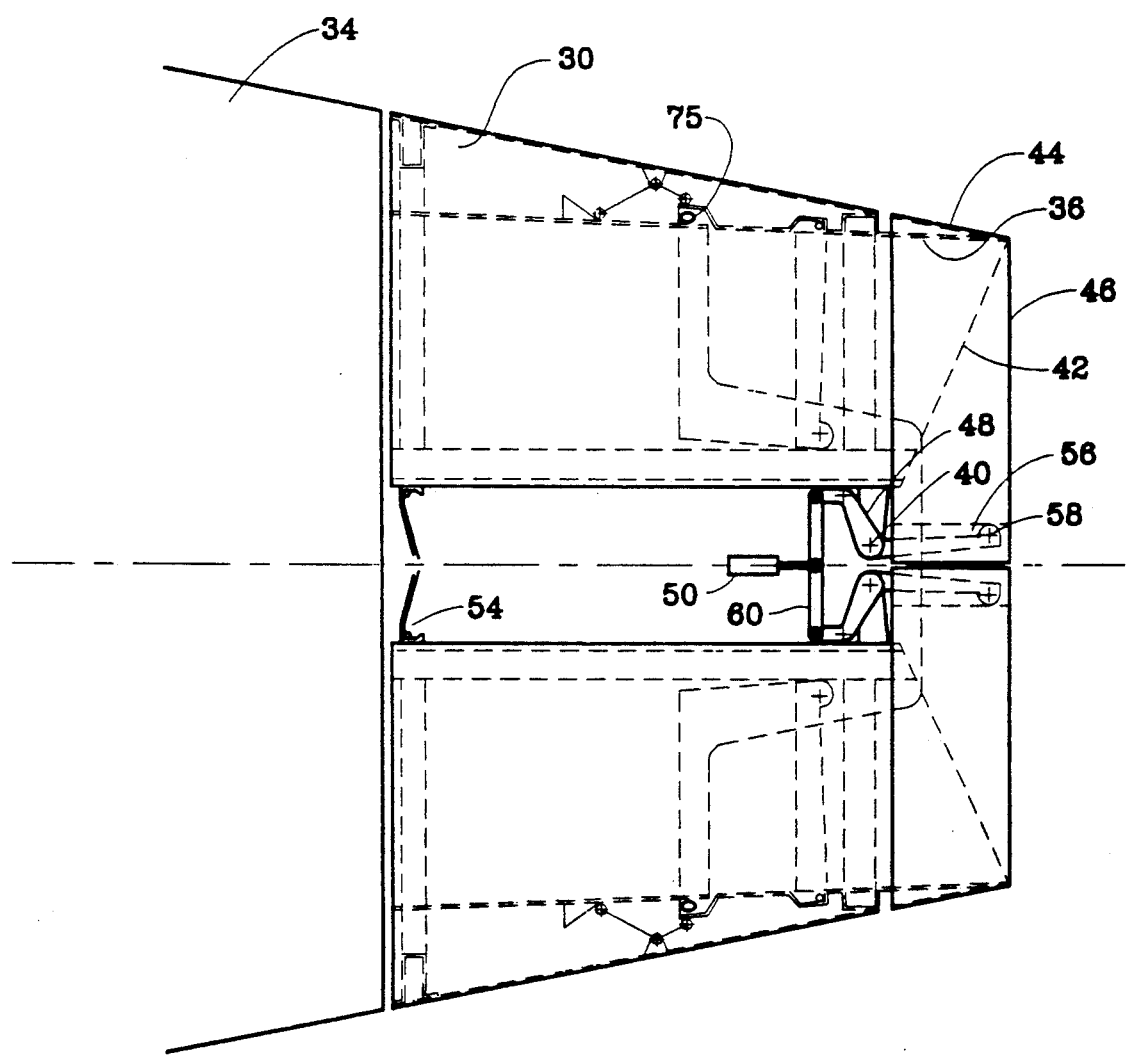
FIG. 4 is a view similar to FIG. 3 showing the unlatching phase of the variable exhaust nozzle.

With reference to FIG. 4, the driving mechanism or actuator 50 drives the arms 48 through links 60 in order to unlatch the rotation axis 40 of the thrust reverser doors 30. In this position, the thrust reverser doors are stowed (FIG. 13). During their motion, the doors 30 close the exhaust area of the variable nozzle, defined by the half-shells 44, in the manner described above. Again, these half-shells which form the nozzle, are supported at 58 by the arms 48 which rotate around the thrust reverser door rotation axis 40. During the motion of the doors 30, the doors maintain the fluid tightness between the fixed structure 34 and the inner skin 36 by means of seal 75. The actuator rod connected to the links 60 is guided by any suitable track or guide (not shown).

Figure 5:
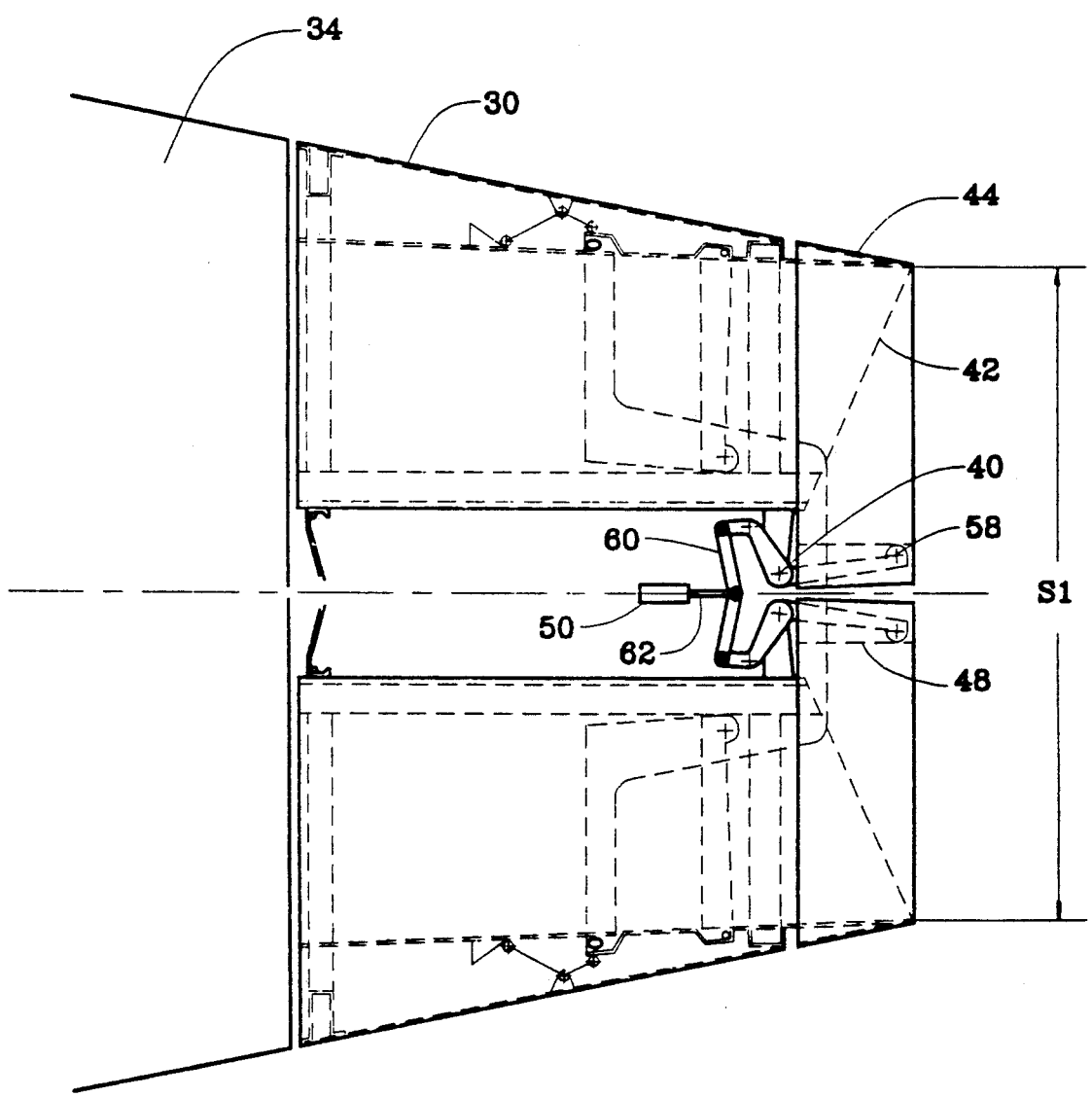
FIG. 5 is a view similar to FIG. 3 showing the nozzle unlatched and ready to be moved to the large exit area position.

Referring to FIG. 5, the exhaust area of the variable nozzle is the same as that of FIG. 3, i.e. in the cruise mode with the minimum dimension S1. However, in FIG. 5, the variable nozzle is unlatched, ready to be moved to the fully opened or take-off position.

Figure 6:
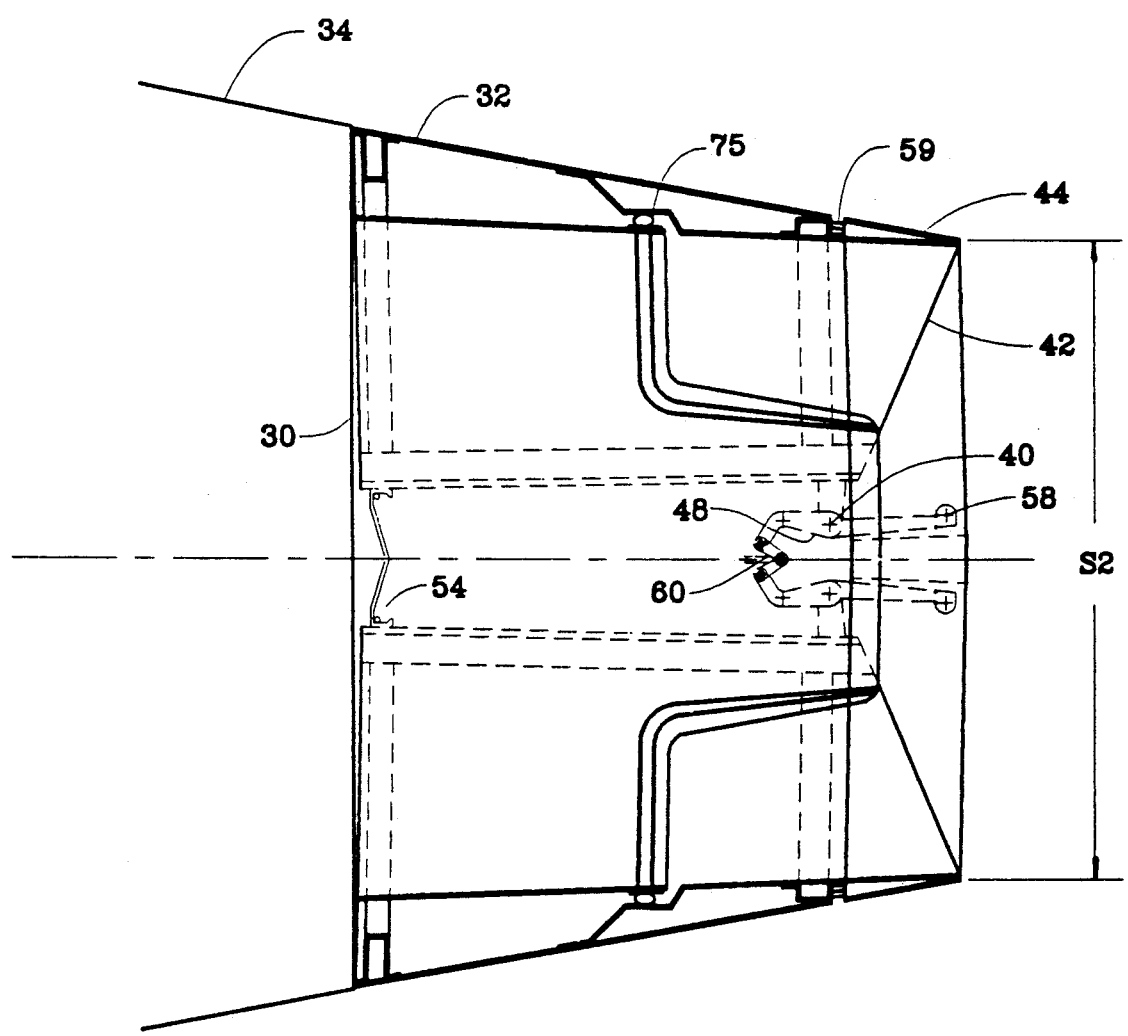
FIG. 6 is a view similar to FIG. 3 showing the thrust reverser in the large area or take-off position.

In FIG. 6, the variable exhaust area nozzle is shown in the fully opened or take-off position (S2). The half-shells 44 have been driven about their upstream pivot axis 40 by the reverser doors 30 and links 59 as well as by arms 56. The thrust reverser doors 30 which have pivoted about the axis 40 as well as their latch arm 54, still maintain the airtight relationship with the fixed structure 34 and the inner skin 36 of the reverser doors by means of the seal 75. It is important to note that this configuration also ensures internal flow continuity of the profile.

With reference to FIG. 7, inner and outer flow continuity is ensured between the half-shells 44. The shells 44 are comprised of outer skins 90, which ensure continuity with the outer skins 32 of the doors 30, and inner skins 92 which envelope the inner skins 36 of the doors 30 and also form the exhaust nozzle of the jet engine. As seen in FIG. 7, when the variable nozzle is in its fully closed (cruise) position, there is a perfect continuity of the inner contour of the variable nozzle. Air tightness is ensured by a longitudinal seal installed between the inner skins 92 on the two half-shells.

When the arms 56 supporting the shells 44 at pivots 58 are caused to pivot about their upstream axis 40, (FIG. 6) to reach the fully opened position of the nozzle, then as shown in FIG. 8 there is still fluid tightness between the inner skins 92 of the shells 44. There is no inner contour discontinuity since the apparent gap which is created between the skins 92 is parallel to the exhaust flow on the outer profile of the shells 44; the gap which is created between skins 90 is also parallel to the outer flow and therefor there is no profile discontinuity.

FIGS. 9 and 10 show another arrangement of the cross-section of the shells 44. In this arrangement, there is a fixed center beam 94 which ensures the continuity of the inner and outer profiles of the nozzle and also fluid tightness. This center beam is attached to the fixed structure 34, thus forming an extended arm.

Figure 14:
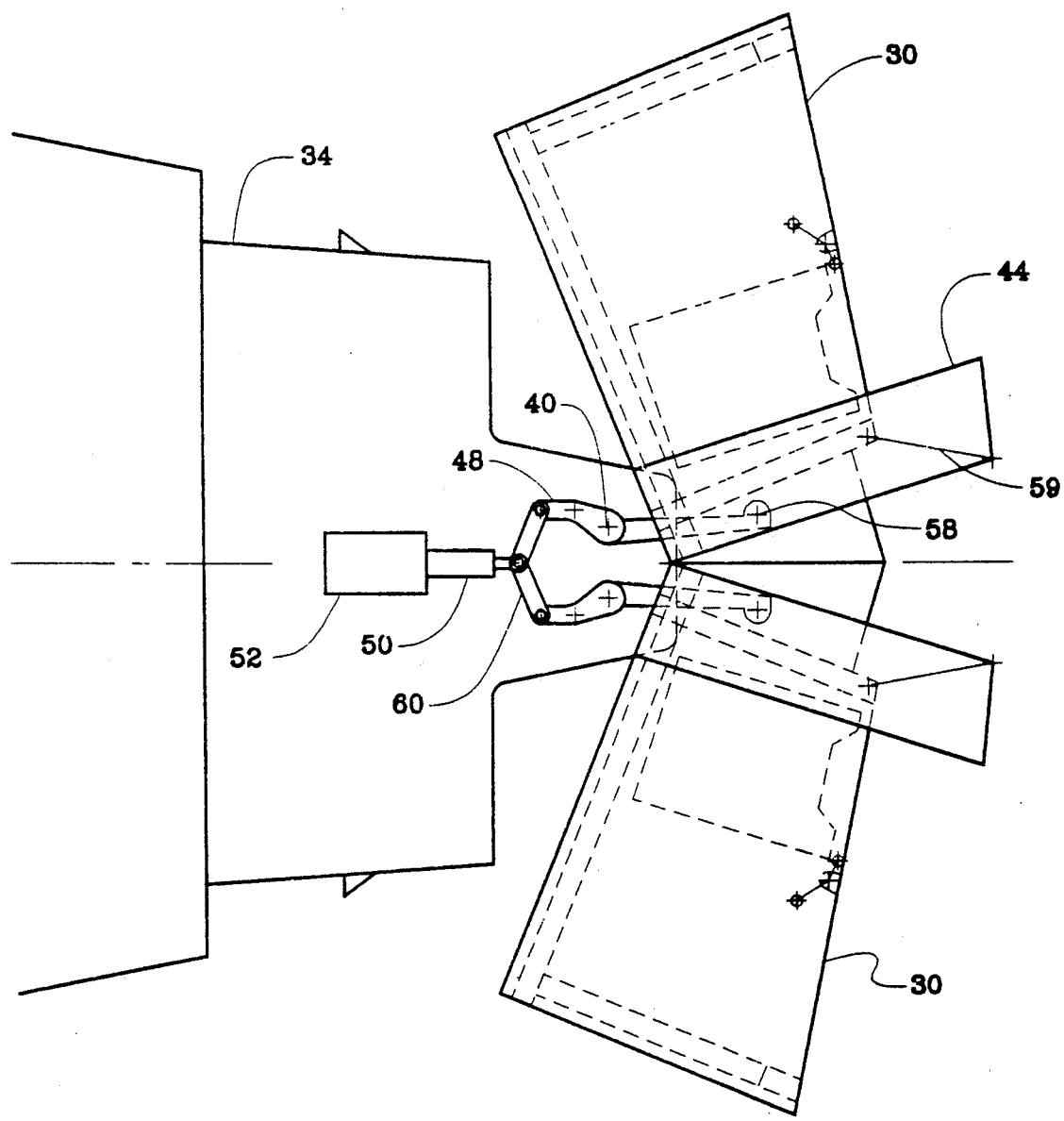
FIG. 14 is a longitudinal sectional view showing the thrust reverser doors in the deployed configuration.

In FIG. 14, the thrust reverser doors 30 are shown in their deployed positions. The doors 30 have been moved into this position by the actuation system 52 with the actuation system 50 of the variable nozzle in the cruise configuration. During their rotation about the pivot axis 40, the thrust reverser doors 30 drive through their respective linkage 59 the half-shells 44, which in turn pivot about their axis 58. The shells 44 which formed the variable exhaust nozzle when the doors were in the stowed configuration are surrounding their respective door 30, allowing the inner skin 36 to penetrate inside the shells and thus abut on their trailing edge (or abutment fittings) along the centerline of the thrust reverser exhaust nozzle.

In order to allow the displacement of the links 59, the inner skins 36 are trimmed, although this has no effect on the continuity of the inner profile of the variable nozzle, since this occurs outboard of the inner skins 36, at 90° from the pivot axis 40 of the doors, i.e. where the fishmouth extension of the inner skin is at a maximum.

Figure 16:
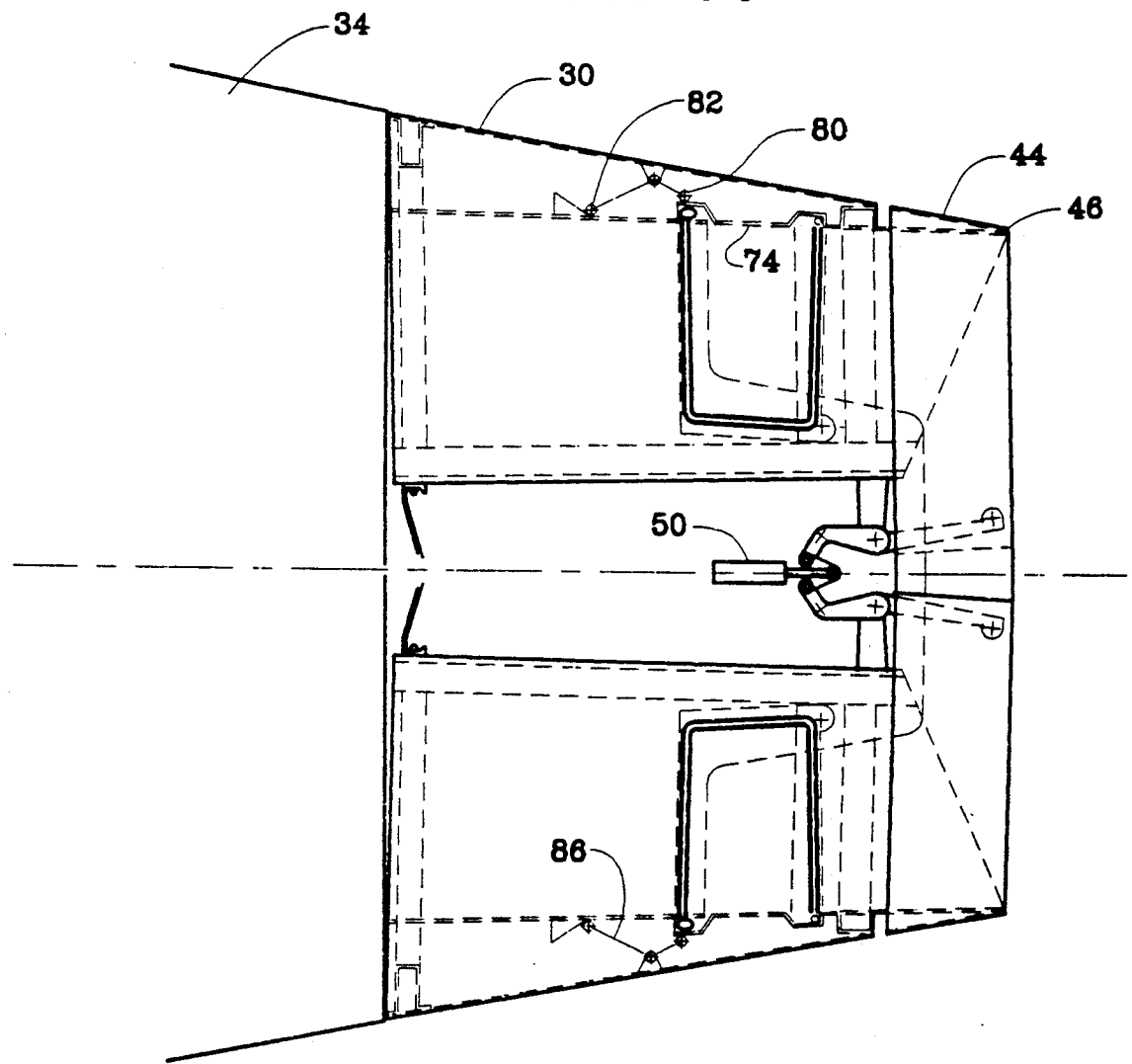

An alternate embodiment of the sealing arrangement is shown in FIGS. 15, 16, 10 and 11. Referring to FIGS. 15 and 16, it is seen that the jet flow continuity between the fixed structure 34 and the inner skin 36 of the thrust reverser doors 30 is ensured by a movable skin 74 hinged at 76 on the door 30. The seal 77 installation can either be of a one piece seal fixed on the skin 74, or may be a two piece seal, with one portion fixed onto the skin 74 and the other portion attached to the fixed structure 34. The skins 74 are maintained in position by the thrust reverser doors 30 on which are hinged levers 78. These levers 78 have a V-shape with one extremity 80 being in contact with the movable skin and the other extremity 82 on the fixed structure 34. The extremity 80 of the arm 78 maintains the pressure on the seal forced by the other extremity 82 to remain in this position. The extremities 80 and 82 are such that they can freely roll on the fixed structure 34. The thrust reverser doors 30 are therefor the driving mechanism of the movable skins 74, ensuring fluid tightness and inner flow profile continuity.

Figure 11:
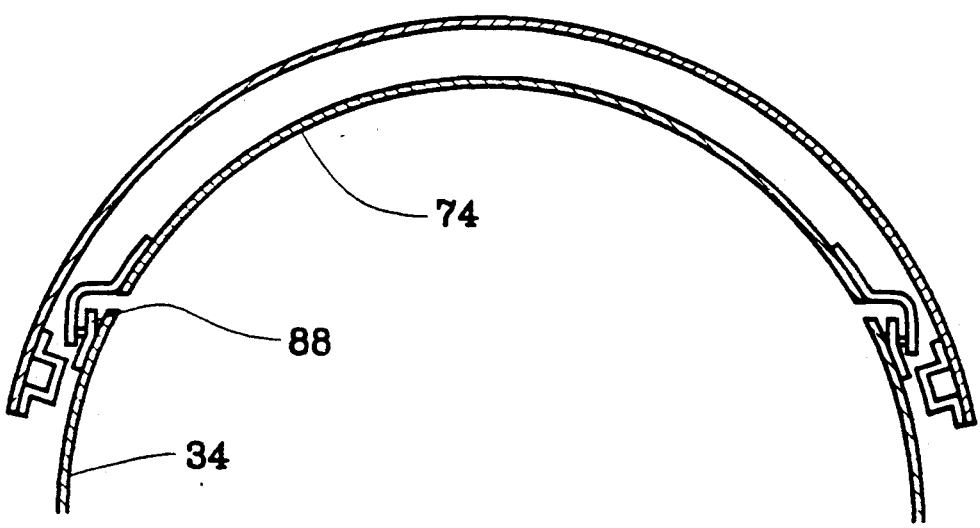
FIG. 11 is a transverse cross-sectional view of the movable inner skin, corresponding to the cruise position.
Figure 12:
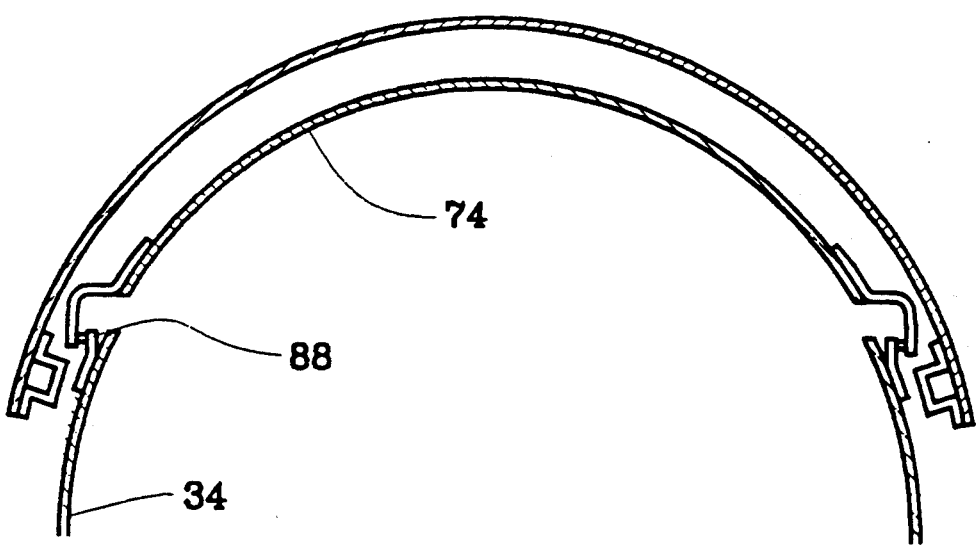
FIG. 12 is a transverse cross-sectional view of the movable inner skin, corresponding to the large exit area position.

As shown in FIG. 11, air tightness between the fixed structure 34 and the movable skin 74 is also ensured. The same is true in FIG. 12 when the variable exhaust nozzle has been opened to its take-off position. Although in FIGS. 11 and 12 the longitudinal seal is shown on the outboard face of member 34, in an alternative embodiment the seal could be applied on the inboard face of the member 88. The airtightness of the upstream radial portions of the seal is ensured by the V-shaped lever 78, as the extremity 82 has rolled on the fixed ramp 86 attached to the fixed structure 34.

Although only one type driving system is shown for the pivot axis of the reverser doors, there are several variants which could be considered for moving the pivot axis 40. The present invention relies on the thrust reverser doors driving an exhaust nozzle to vary the throat area of the nozzle and adapt it to the various flight conditions of the aircraft, in order to optimize performance of the engine at take-off, climb and cruise. It will be understood that additional embodiments for moving the hinge point are possible.

Although FIG. 14 shows the thrust reverser deployed with the control system 50 of the reverser door axis 40 in the cruise configuration, the system can be designed to deploy when the control system 50 is in the fully opened position (corresponding to the take-off position.)

While this invention has been described as having certain preferred features and embodiments, it will be understood that it is capable of still further variation and modification without departing from the spirit of the invention, and this application is intended to cover any and all variations, modifications and adaptations of the invention as may fall within the spirit of the invention and the scope of the appended claims.

I claim:

1. A thrust reverser for jet engines comprising a pair of symmetrical thrust reverser door members, each of said door members being pivotally mounted on an axis which is substantially diametrically positioned with respect to the exhaust nozzle of an engine so as to pivot between a stowed position in which said doors are out of the direct path of exhaust from the engine and a deployed position in which said doors are in the path of the engine exhaust for deflecting the exhaust and creating a braking thrust, said doors having a scarfed trailing edge, a pair of half-shells surrounding at least the trailing edges of said doors and forming a planar exhaust outlet for the engine and being pivotally mounted to a mounting arm, said mounting arm being pivotally mounted to said axes, actuator means for moving said door mounting axes and thereby moving said reverser doors and said half-shells for varying the area of said planar exhaust outlet between minimum and maximum exhaust area positions, and second actuator means for pivoting said doors between said stowed and deployed positions.

2. A thrust reverser for jet engines as in claim 1 and wherein said half-shells are pivotally mounted to first link arms downstream of said axes and said link arms are pivotally mounted on said axes.

3. A thrust reverser for jet engines as in claim 2 and including over-center linkage means between said first actuator and said axes.

4. A thrust reverser for jet engines as in claim 3 and including a link member connecting said thrust reverser doors and said half-shells at points spaced approximately 90° from said axes.

5. A thrust reverser for jet engines as in claim 4 and wherein said first and second actuator means comprise linear actuators.

6. A thrust reverser for jet engines as in claim 3 and wherein said over-center linkage means comprises at each pivot point, a second link arm pivotally mounted at one end on said axes and connected to a third link at the other end, said second link arm being pivotally mounted to a fixed structure between said ends, said third links being connected to said second actuator means.

7. A thrust reverser for jet engines as in claim 6 and wherein said first actuator means moves the pivot points of said reverser doors in an arcuate path.

8. A thrust reverser for jet engines as in claim 1 and including seal means for preventing exhaust gas leakage from the area between said doors and the engine structure.

9. A thrust reverser for jet engines as in claim 8 and wherein said seal means includes a movable inner skin for maintaining the seal when the area of said exhaust outlet is changed.

10. A thrust reverser for jet engines as in claim 1 and including latch means for securing the rear portion of said doors when in the stowed position.

11. A thrust reverser for jet engines as in claim 10 and wherein said latch means includes means for accommodating movement of said thrust reverser doors when the area of said exhaust outlet is varied without releasing the latch.

12. A thrust reverser for jet engines as in claim 1 and wherein said thrust reverser doors present no flow discontinuities when said doors are in said stowed position.

13. A thrust reverser for jet engines as in claim 1 and wherein the exhaust nozzle in said stowed position is a convergent nozzle.

14. A thrust reverser for jet engines as in claim 1 and wherein the throat area of the exhaust nozzle is at the trailing edge of the nozzle.

15. A thrust reverser for jet engines as in claim 1 and wherein movement of said thrust reverser doors drives a corresponding movement of said half-shells.

16. A thrust reverser for jet engines as in claim 15 and including a link member connecting said doors and said half-shells for moving said half-shells away from said doors in the deployed position of said doors.

17. A thrust reverser for jet engines comprising a pair of symmetrical thrust reverser door members, each of said door members being pivotally mounted on an axis which is substantially diametrically positioned with respect to the exhaust nozzle of an engine so as to pivot between a stowed position presenting no flow discontinuities and a deployed position, said doors having scarfed trailing edges to enable said pivoting, a pair of half-shells surrounding at least the trailing edges of said doors so as to form a planar exhaust outlet for the engine and being pivotally mounted, actuator means for moving said door mounting axes and thereby moving said reverser doors and said half-shells for varying the area of said planar exhaust outlet between minimum and maximum exhaust area positions, and for pivoting said doors between said stowed and deployed positions.

* * * * *